3,035,097
NOVEL CATALYTIC PROCESS FOR PREPARATION OF MERCAPTANS BY REACTION OF H₂S WITH ALCOHOLS OR ETHERS
Thomas E. Deger, Ambler, Bernard Buchholz, Flourtown, and Roland H. Goshorn, Fort Washington, Pa., assignors to Pennsalt Chemicals Corporation, Philadelphia, Pa., a corporation of Pennsylvania
No Drawing. Filed June 24, 1960, Ser. No. 38,463
15 Claims. (Cl. 260—609)

The invention relates to a novel process for the preparation of mercaptans and deals particularly with the novel use of a catalyst system for the preparation of such products by reaction of hydrogen sulfide with hydroxyl containing compounds (e.g., alcohols) or ethers.

It is well known in the chemical arts to react hydrogen sulfide with alcohols or ethers and obtain mercaptan products. In 1910, Sabatier and Mailhe [Compt. rend. 150, 823–6, 1217–21, 1569–72 (1910)] disclosed their study of the use of dehydration catalysts for this reaction. However, these dehydration catalysts (e.g. the oxides of aluminum, thorium, tungsten, chromium, zirconium, uranium, and molybdenum) also effect removal of the elements of water from the alcohol reactant and this results in unwanted olefin formation. This olefin, in turn, is reactive with the mercaptan product to form large amounts of thioethers (e.g. sulfides) which are unwanted by-products. This problem is discussed in detail by Reid in his recent book "The Organic Chemistry of Bivalent Sulfur," vol. I, p. 19, Chemical Publishing Co. (1958).

Use of a dehydration catalyst has also been disclosed in U.S. 2,786,079 and 2,820,062 where it is shown that alkyl mercaptans can be obtained in improved yields by reacting hydrogen sulfide with alcohols (or with ethers in U.S. 2,820,063) in the presence of an alumina catalyst impregnated with 1.5% to 15% by weight of a heat stable promoter (e.g. Na₂CO₃, CaO, K₂WO₄, Na₂MoO₄, NaVO₃, K₃PO₄). According to the disclosure of U.S. 2,786,079, however, this prior art process is said to suffer from gradual loss in selectivity and activity because of degeneration. In order to avoid this problem, the catalyst is further treated, as disclosed in U.S. 2,786,079, by the addition of an alkali or alkaline earth metal salt of an organic acid (e.g., sodium oxalate, calcium acetate, potassium tartrate). Although this catalyst system is quite efficient it has a severe disadvantage in that relatively large amounts of unreacted alcohol are found in the product mercaptan. This alcohol (and particularly when it contains three or more carbon atoms) is difficult to remove by simple distillation techniques because of the formation by the alcohol and mercaptan of constant boiling mixtures (see Reid, vol. I, p. 59). Such constant boiling mixtures require special separating techniques, as for example, the preferential absorption method of U.S. 2,647,150 which entails percolation of the alcohol-mercaptan mixture through activated silica gel. It has been found that by operating the process with this prior art catalyst at rather high temperatures, the amount of alcohol in the product can be reduced significantly. But when this is done, the efficiency of the catalyst is reduced and yields are considerably less than obtained at the lower temperatures.

It has now been found by means of this invention that excellent yields and conversions to mercaptan products essentially devoid of alcohol reactant may be obtained by reaction of alcohols or ethers with hydrogen sulfide in the presence of a uniquely promoted dehydration catalyst system. This is accomplished according to the process of this invention by reacting an oxygen compound taken from the class of alcohols and acyclic ethers with hydrogen sulfide in the presence of a catalyst comprising a dehydration catalyst promoted with an activating amount of a compound taken from the class of heteropoly acids and their alkali metal and alkaline earth metal salts.

The mercaptans that may be prepared by this novel process include both aliphatic and aromatic mercaptans (e.g., thioalcohols and thiophenols). The starting alcohol or ether will preferably be selected from the class of alcohols and acyclic ethers which contain up to eighteen carbon atoms. Of the alcohol class of reactants, the preferred group will be the aliphatic alcohols and useful examples include methanol, ethanol, n-propanol, isopropanol, n-butanol, t-butanol, the isomeric pentanol, n-octanol, n-dodecanol, hexadecanol, octadecanol and the like. Many of the higher molecular weight alcohols are available as "Lorol" alcohols made by E. I. du Pont de Nemours and Company, Inc. which are mixtures of alcohols having the general formula $CH_3(CH_2)_nCH_2OH$ where $n$ is 8, 10, 12, 14 and 16. It is not necessary that the alcohol reactants be anhydrous and it is an unexpected advantage of this process that alcohol reactants containing rather large amounts of water may be used without adverse effect.

In addition to the above aliphatic alcohols, aromatic hydroxyl containing compounds are converted to mercaptans by this process. Preferably phenol will be used to give thiophenol, but both aliphatic and aromatic hydroxyl containing compounds having heat stable functional groups (e.g. halogen, nitro, etc). may also be used.

The ethers which are converted to mercaptains by this process will be selected preferably from the group of aliphatic ethers. Thus, useful ethers include dimethyl ether, methyl ethyl ether, diethyl ether, di-n-butyl ether, ethyl n-butyl ether, ethyl hexyl ether, diisopropyl ether, di-n-hexyl ether, t-butyl ethyl ether, and the like. Aromatic ethers such as anisole and diphenyl ether may also be used, however.

It is significant to note that this process is operable only with acyclic ethers. With cyclic ethers such as tetrahydrofuran the ring remains intact and the process yields a cyclic thioether. Such a process is covered in the application of Buchholz, Deger and Goshorn, S.N. 38,462, filed of even date herewith.

The catalyst used to carry out the process of this invention is prepared quite readily. An appropriate dehydration catalyst such as alumina, titania, silica, chromia, or other oxides such as those of tungsten, uranium, molybdenum, etc., is simply saturated with an aqueous solution containing a heteropoly acid or its alkali metal or alkaline earth metal salt. The aqueous mixture is agitated thoroughly to ensure even distribution and after the liquid phase is removed by evaporation the dry solid is ready for use. The amount of heteropoly acid or salt used will be such that from about 0.1% to 10% (preferably from 0.5% to 5%) by weight of the final dry catalyst composite is the heteropoly acid compound. Methods for making these catalysts are also described in U.S. Pat. 2,886,515.

The dehydration catalyst base will be preferably an activated alumina and such materials are well known and readily available. These activated aluminas are those sorptive aluminum oxides which usually have a surface area greater than 10 square meters per gram. Some of these materials are obtained directly from bauxites or they may be made synthetically, as for example by calcination of alpha alumina trihydrate. Some specifically useful activated aluminas include Alcoa Activated Aluminas designated as Grade F, Grade H, X–21, and R–2396.

These catalysts are easily handled and are stable to storage. After preparation and drying they have the physical appearance of the dehydration catalyst base from which they are made. They may be granulated to various sizes and used in the conventional manner in conventional catalytic equipment.

The heteropoly acids and their salts used to make the catalysts of this invention are well known compounds. They are defined by Sidgewick in his book "The Chemical Elements and Their Compounds," vol. II, page 1042 (1940) and are those complicated structures in which a large number (usually 6, 9 or 12) of one acid residue (commonly molybdic or tungstic acid) is combined with a single residue of another acid selected from the group of oxyacids of boron, silicon, germanium, titanium, zirconium, thorium, phosphorus, vanadium, arsenic and manganese. These heteropoly acids are usually hydrated with a large, but definite, number of water molecules, but the number may range from zero to as high as 70. Heteropoly acids are also described in U.S. 2,886,515 in terms of a central acid forming element and outer acid forming elements. The outer acid forming elements will be regarded as those which are attached to the central acid forming element of the acid forming functional group in predominant number. The central acid forming element is any element which is at least trivalent and is capable of forming an oxygen containing compound which has acidic properties, and/or an analogous thio compound of acidic properties in which all or part of the oxygen atoms are replaced by sulfur. The outer acid forming elements are molybdenum, chromium, tungsten and vanadium. Many of the central acid forming elements can be selected from groups VA and VIA; whereas the outer acid forming elements can be chosen from groups VB and VIB of the periodic table. It is also contemplated employing heteropoly acids in which more than one outer acid forming element is present in the said functional group, as well as more than one central acid forming element is present therein. The central acid forming elements are, for example, phosphorus, germanium, tellurium, arsenic, aluminum, boron, silicon, manganese, cobalt, rhodium, chromium, selenium, iodine, platinum, antimony, etc. They may be prepared readily by any of the methods given in "Inorganic Synthesis," vol. 1, 1st ed., pp. 129–133 (1939). Their alkali metal and alkaline earth metal salts are readily formed by reacting an aqueous solution of the acid with an alkali metal or alkaline earth metal hydroxide or carbonate (e.g. NaOH, KOH, Ba(OH)$_2$, Ca(OH)$_2$, Sr(OH)$_2$, K$_2$CO$_3$, Cs$_2$CO$_3$, Rb$_2$CO$_3$, etc.). Some common heteropoly acids which may be used in this invention are phosphotungstic acid, phosphomolybdic acid, silicotungstic acid, borotungstic acid and boromolybdic acid. Other useful heteropoly acids and their preparation are thoroughly discussed in U.S. Pat. 2,886,515, and are specifically molybdenum acid iodate.

$$H_2[I_2O_4(MoO_4)] \cdot 1H_2O$$

molybdenum acid selenite, 3SeO$_2 \cdot$10MoO$_3 \cdot$XH$_2$O; molybdenum acid arsenate, As$_2$O$_5 \cdot$18MoO$_3 \cdot$38H$_2$O;

$$H_9[M^{III}(MoO_4)_6] \cdot XH_2O$$

wherein X is 1 to 70 and M is a trivalent element selected from Al, Cr, Fe, Co, Mn or Rh; ammonium acid salt of aluminum molybdate, (NH$_4$)$_3$H$_6$[Al(MoO$_4$)$_6$]$\cdot$7H$_2$O; molybdenum acid titanate, TiO$_2 \cdot$12MoO$_3 \cdot$22H$_2$O; molybdenum acid germanate, GeO$_2 \cdot$12MoO$_3 \cdot$32H$_2$O; molybdenum acid vanadate, V$_2$O$_5 \cdot$8MoO$_3 \cdot$5H$_2$O; ammonium acid salt of thiovanadate-thiomolybdate, $$(NH_4)_5H_3[H_2(MoS_4)_4(VS_3)_2] \cdot 10H_2O$$

ammonium acid salt of nickelous molybdate, $$(NH_4)_4H_6[Ni(MoO_4)_6] \cdot 5H_2O$$

ammonium acid salt of cupric molybdate, $$(NH_4)_4H_6[Cu(MoO_4)_6] \cdot 5H_2O$$

ammonium salt of ferric molybdate, $$(NH_4)_3H_6[Fe(MoO_4)_6] \cdot 7H_2O$$

ammonium salt of rhodium molybdate, $$(NH_4)_3H_6[Rh(MoO_4)_6] \cdot 7H_2O$$

molybdenum acid platinate, PtO$_2 \cdot$10MoO$_3 \cdot$XH$_2$O; chromium acid iodate, 2CrO$_3 \cdot$I$_2$O$_5 \cdot$5H$_2$O; ammonium acid salt of phosphovanadate, (NH$_4$)$_5$H$_2$[P(V$_2$O$_6$)$_6$]$\cdot$21H$_2$O; silicomolybdic acid, H$_4$[SiMo$_{12}$O$_{40}$]$\cdot$XH$_2$O, wherein X can be 5 to 29; phosphomolybdic acid, $$P_2O_5 \cdot 24MoO_3 \cdot 63H_2O$$

phosphotungstic acid, P$_2$O$_5 \cdot$24WO$_3 \cdot$63H$_2$O; silicomolybdic acid, SiO$_2 \cdot$12MoO$_3 \cdot$32H$_2$O; silicotungstic acid, $$SiO_2 \cdot 12MoO_3 \cdot 32H_2O$$

borotungstic acid, B$_2$O$_3 \cdot$24WO$_3 \cdot$65H$_2$O; aluminomolybdic acid, H$_{10}$[Al(MoO$_4$)$_6$]$\cdot$10H$_2$O; and periodotungstic acid, I$_2$O$_7 \cdot$12WO$_3 \cdot$11H$_2$O. However, it is found that best results are obtained with those heteropoly acids containing tungsten as the outer acid forming element and the preferred catalysts for this process are phosphotungstic acid, silicotungstic acid, and their alkali and alkaline earth metal salts deposited on alumina. As can be seen from the data of the examples these catalysts are significantly superior to others evaluated.

The dry catalyst composite prepared as described above is simply charged into a reaction vessel (conveniently, a cylindrical reactor) and the reactant vapors of alcohol or ether together with hydrogen sulfide vapors are passed through at temperatures between about 100° and 500° C. The reaction is preferably carried out at temperatures between about 250° and about 400° C. at slight superatmospheric pressures (say up to about 250 p.s.i.g.). Atmospheric pressure is also operable and although pressures up to about 200 atmospheres are useful there is no need to exceed about 300 p.s.i.g. The space velocities of the alcohol or ether and hydrogen sulfide may vary over a wide range, but will usually be between about 10 and 400 cubic centimeters of alcohol vapor at standard temperature and pressure per hour per cubic centimeter of catalyst, and will preferably be 25 to 200. Likewise, the ratios of reactants may vary widely, but preferably a mole ratio of H$_2$S to alcohol (or ether) of from about 0.5:1 to 20:1 will be used and the higher ratios will be used to suppress the formation of sulfide products. When sulfide products are desired, however, the lower ratios (say from 0.5:1 to 1:1) will be used. It will be understood that in lieu of carrying out the reaction in a fixed bed reactor, fluid bed operation and other equipment and obvious process changes may be made.

When converting the lower molecular weight alcohols to mercaptans, the dehydration catalyst base promoted with the free heteropoly acid gives better results than catalysts prepared with their salts. On the other hand, when converting the higher alcohols (e.g. C$_6$ alcohols and higher) the catalysts containing the salts of heteropoly acids are the better catalysts. It is believed that this difference is due to the solubility of the heteropoly acid in alcohols and the higher alcohols may be present in liquid form. Accordingly, higher molecular weight alcohols are present in the reactor, at least in part, as a mist or in liquid form condensed upon the catalyst and this liquid probably removes the heteropoly acid from the dehydration catalyst thus reducing its effectiveness and life. The salts of the heteropoly acids, on the other hand, apparently are not appreciably soluble in the higher molecular weight alcohols and are thus not affected.

The major advantage of the process of this invention over prior art methods is that exceptionally high conversions of the alcohol (or ether) are obtained. This, in turn, leads to little (less than 5%) or no reactant alcohol in the effluent product stream and this is most desirable because it simplifies separation and purification techniques. Another advantage of this novel process is the long life of the catalyst. Whereas previously known catalysts need frequent rejuvenation, the catalysts used in the process of this invention have been used for over 2500 hours without loss of activity. This is a remarkably long catalyst life in view of the 20 to 150-hour catalyst life obtained with an alumina catalyst promoted with alkali and alkaline earth metal oxides as illustrated in U.S. Pat. 2,786,079.

Still another advantage of this process when using ethanol and a phosphotungstic acid compound as catalyst is that the catalyst is also a very active catalyst for the reaction of hydrogen sulfide and ethylene to form ethyl mercaptan. Thus, any small amount of ethylene product which may be formed may be converted to ethyl mercaptan by recycling the exit stream of excess hydrogen sulfide containing the ethylene through the reactor over the catalyst. Thus, the amount of ethylene does not build up, being instead converted to the desired ethyl mercaptan product. Even without recycle, the presence of olefins in the product is not a serious disadvantage because they are easily removed from the product mixture. Alcohols, on the other hand, form constant boiling mixtures which make separation very difficult. As pointed out above, a further advantage of the process of this invention is that it does not require use of anhydrous reactants.

In order to more fully illustrate and describe the invention, the following detailed examples are given.

EXAMPLE 1

A mixture of hydrogen sulfide and 1-butanol in a mole ratio of 6:1 was preheated to 300° C. and passed over various catalyst compositions. The catalyst was held in a cylindrical reactor held at 300° C. and the system was maintained at a positive pressure within the reactor of 135 p.s.i.g. An hourly alcohol space velocity of 55 was used. The hourly alcohol space velocity is defined as the number of cubic centimeters of the alcohol vapor feed at standard temperature and pressure used per hour per cubic centimeter of catalyst in the reactor. The following Table I lists the catalysts used and the results obtained.

TABLE I

| Catalyst | Percent Conversion of n-Butanol to Butyl Mercaptan [2] | Product Analysis [1] | | |
|---|---|---|---|---|
| | | Percent n-$C_4H_9$SH | Percent sec-$C_4H_9$SH | Percent n-$C_4H_9$OH |
| 2% Phosphotungstic acid on $Al_2O_3$ | 84 | 90.9 | 2.1 | 0.0 |
| 2.4% Phosphotungstic acid on $Al_2O_3$ | 84 | 92.2 | 0.8 | 0.4 |
| 1% Silicotungstic acid on $Al_2O_3$ | 81 | 89.0 | 1.0 | 2.0 |
| 2% Silicotungstic acid on $Al_2O_3$ | 85 | 90.7 | 1.3 | 0.2 |
| 4% Silicotungstic acid on $Al_2O_3$ | 83 | 90.3 | 2.7 | 0.2 |
| 2% Potassium phosphotungstate on $Al_2O_3$ | 80 | 89.5 | 0.5 | 2.7 |
| 10% Potassium phosphotungstate on $Al_2O_3$ | 68 | 72.0 | | |
| 1% Phosphotungstic acid +1% potassium phosphotungstate on $Al_2O_3$ | 81 | 90.4 | 0.6 | 1.5 |
| $Al_2O_3$ | 48 | | | |

[1] Percent by weight after separation of water and removal of hydrogen sulfide and butene.
[2] Based on butanol.

It will be observed from the above data that use of 1% to 4% of the heteropoly acids or their salts on alumina permits conversions of n-butanol to n-butylmercaptan of 80% or higher which is almost twice that obtained on alumina in the absence of the heteropoly acid compound. The data also show that high levels (e.g. above about 5%) of the heteropoly acid or salt are unnecessary and are, in fact, somewhat detrimental to conversion. Also evident is the low amount of reactant alcohol and sec-butyl mercaptan by-product in the product obtained.

The primary mercaptan product is easily separated from this small amount of impurities by conventional distillation techniques without serious loss of mercaptan product.

EXAMPLE 2
Effects of Temperature

Following the essential details of Example 1 at various reaction temperatures, n-butanol was converted to n-butyl mercaptan using a 2% phosphotungstic acid on alumina catalyst. Table II lists the various temperatures used and the results obtained.

TABLE II

| Catalyst Temp., ° C. | Percent Conversion n-Butanol to Butyl Mercaptan [2] | Product Analysis [1] | | |
|---|---|---|---|---|
| | | Percent n-BuSH | Percent sec-BuSH | Percent n-BuOH |
| 280 | 71.4 | 77.7 | 0.3 | 5.4 |
| 290 | 79.0 | 90.1 | 1.0 | 0.5 |
| 300 | 84.0 | 90.1 | 2.1 | 0.0 |
| 310 | 84.0 | 89.6 | 3.4 | 0.0 |
| 320 | 80.6 | 88.0 | 3.5 | 0.0 |

[1] By weight after removal of water, hydrogen sulfide, and butene.
[2] Based on butanol.

It is apparent from Table II that about 300° C. is the optimum operating temperature of this system and that at this optimum temperature both maximum conversion to mercaptan and the complete absence of reactant alcohol are achieved.

EXAMPLE 3

As in Example 1, 1-octanol was reacted with $H_2S$ in a 1:7.7 mole ratio at a temperature of 290° C., at a pressure of 135 p.s.i.g. and at an hourly alcohol space velocity of 55. Table III lists the results obtained.

TABLE III

| Catalyst | Percent Conversion n-Octanol to Octyl Mercaptan [2] | Product Analysis [1] | | |
|---|---|---|---|---|
| | | Percent n-$C_8H_{17}$SH | Percent $C_8H_{16}$ [3] | Percent n-$C_8H_{17}$OH |
| 2% Potassium phosphotungstate on $Al_2O_3$ | 88.0 | 92.0 | 3.3 | 1.7 |
| 2% Silicotungstic acid on $Al_2O_3$ | 84.2 | 89.5 | 6.0 | 1.5 |
| $Al_2O_3$ (no promoter) | 60.0 | | | |

[1] By weight after removal of water and hydrogen sulfide.
[2] Based on octanol.
[3] Octene-1.

EXAMPLE 4

The results obtained in the preparation of n-dodecyl mercaptan are shown in Table IV. The operating conditions in these runs were as follows: a hydrogen sulfide to 1-dodecanol mole ratio of 8 to 1, a catalyst temperature of 300° C., and an hourly alcohol space velocity of 50 at 135 p.s.i.g. pressure.

TABLE IV

| Catalyst | Percent Conversion n-Dodecanol to Dodecyl Mercaptan [2] | Product Analysis [1] | | |
|---|---|---|---|---|
| | | Percent n-$C_{12}H_{25}$SH | Percent $C_{12}H_{24}$ [3] | Percent n-$C_{12}H_{25}$OH |
| 2% Potassium phosphotungstate on $Al_2O_3$ | 88.0 | 92.0 | 2.3 | 0.6 |
| 2% Silicotungstic acid on $Al_2O_3$ | 82.7 | 90.0 | 8.8 | 1.3 |
| $Al_2O_3$ (no promoter) | 68.0 | | | |

[1] By weight after removal of water and hydrogen sulfide.
[2] Based on dodecanol.
[3] Dodecene-1.

The high conversions, high product purity, and negligibly small amounts of unreacted alcohol in the product obtained with these catalysts are well illustrated in Tables III and IV.

EXAMPLE 5

Methanol was converted in high yield to methyl mercaptan and dimethyl sulfide with a 2% phosphotungstic acid on alumina catalyst. At 335° C. catalyst temperature, 6 to 1 molar $H_2S$ to methanol ratio, 135 p.s.i.g. pressure and 55 hourly alcohol space velocity, methanol gave 86% conversion to methyl mercaptan and 12% conversion to dimethyl sulfide (98% total conversion of methanol to sulfur containing products). No unreacted methanol or dimethyl ether appeared in the product.

EXAMPLE 6

Ethanol (95%) was converted 85% to ethyl mercaptan, 7% to diethyl sulfide, and 8% to ethylene (92% conversion to sulfur products) with a 2% phosphotungstic acid on alumina catalyst. The operating conditions employed in this run were as follows: Catalyst temperature, 355° C.; molar $H_2S$ to ethanol ratio, 6:1; pressure, 235 p.s.i.g.; hourly alcohol space velocity, 55. Analysis of the product showed it to contain only 0.06% by weight unreacted ethanol and 0.3% by weight of diethyl ether. The excess hydrogen sulfide exiting from the reactor and containing the ethylene by-product was recycled through the reactor and over the catalyst to convert the ethylene to ethyl mercaptan.

When ethanol containing 30% by weight of water was used in the above run under the same conditions, the conversion to ethyl mercaptan remained unchanged.

EXAMPLE 7

Example 5 was repeated using a catalyst of 2% potassium phosphotungstate on alumina (instead of phosphotungstic acid). The methanol was converted 82% to methyl mercaptan and 16% of dimethyl sulfide.

EXAMPLE 8

Dimethyl ether was passed over a 2% phosphotungstic acid on alumina catalyst at an hourly space velocity of 55. The catalyst temperature was 355° C. A pressure of 135 p.s.i.g. and a molar $H_2S$:ether ratio of 6:1 were employed. The conversions based on the ether were 72% to methyl mercaptan and 28% to dimethyl sulfide.

Using a 2% potassium phosphotungstate on alumina catalyst with the same operating conditions, conversions of 67% to methyl mercaptan and 32.5% to dimethyl sulfide were obtained.

EXAMPLE 9

A 6:1 molar ratio of $H_2S$ and ethanol was passed over a 2% potassium phosphotungstate on alumina catalyst. The hourly space velocity of the alcohol was 55. A catalyst temperature of 355° C. and pressure of 175–235 p.s.i.g. were employed. Analysis of the product showed an 81% conversion of ethanol to ethyl mercaptan, 13% to diethyl sulfide, and 5% to ethylene. The ethylene is converted to ethyl mercaptan by recycle as in Example 6.

EXAMPLE 10

A mixture of $H_2S$ and diethyl ether in a 6:1 mole ratio was passed over a 2% phosphotungstic acid on alumina catalyst at 355° C. The hourly space velocity of the ether was 37. The presure was 235 p.s.i.g. The conversions based on the ether obtained were as follows: ethyl mercaptan, 82%; diethyl sulfide, 15%; ethylene, 3%.

EXAMPLE 11

Normal-Propyl Mercaptan $H_2S$ and 1-propanol in a 4:1 mole ratio were passed over a 2% phosphotungstic acid on alumina catalyst at 375° C. and 135 p.s.i.g. pressure. The alcohol was fed at a space velocity equivalent to 50 cc. of vapor at standard conditions/hr./cc. catalyst. The reaction produced normal propyl mercaptan (75% conversion), isopropyl mercaptan (2.5% conversion), propylene (11% conversion), and dipropyl sulfide (5% conversion). Only 0.6% by weight of propanol was found in the product mercaptan.

EXAMPLE 12

Normal-Butyl Mercaptan

The following catalysts as shown in Table V were studied using a mixture of $H_2S$ and 1-butanol in a 6:1 mole ratio with a catalyst temperature of 300° C. and pressure of 135 p.s.i.g. The butanol hourly space velocity was 55.

TABLE V

| Catalyst | Percent Conversion to $C_4H_9SH$ |
|---|---|
| 2% calcium phosphotungstate on alumina | 77 |
| 2% of a mixture of potassium, cesium and rubidium phosphotungstates on alumina [1] | 82 |
| 2% phosphotungstic acid on thoria-alumina [2] | 76 |

[1] Prepared by reaction with phosphotungstic acid of a commercially available mixture of K, Cs, and Rb carbonates ("Alkarb," American Potash and Chemical Co.).
[2] 10% thoria on alumina.

EXAMPLE 13

Thiophenol

Warm phenol was pumped as a liquid and mixed with $H_2S$. The mixture containing $H_2S$ and phenol in a 6:1 mole ratio was passed through a preheater at 375° C. and then into a fixed-bed reactor containing a 2% potassium phosphotungstate on alumina catalyst at 350° C. A phenol hourly space velocity of 55 and a pressure of 135 p.s.i.g. were used. A 15% conversion of phenol to thiophenol resulted. A previous reference (Sabatier and Mailhe, Compt. rend. 150, 1670 (1914)) cites only an 8% conversion for this reaction using a thoria catalyst at about 450° C.

EXAMPLE 14

This example compares the process of this invention over a promoted alumina catalyst of the prior art.

A. Using a catalyst of 10% by weight of potassium tungstate on alumina corresponding to the catalysts described in U.S. 2,820,062 it was determined that optimum conversions ranging from 76% to 84% of butanol to butyl mercaptan were obtained at 300° C., 135 p.s.i.g., a mole ratio of $H_2S$ to butanol of 6:1 and an alcohol space velocity of 25 cubic centimeters of vapor per hour per cubic centimeter of catalyst. When the alcohol space velocity was increased to 55 or when the temperature was increased or decreased 10° C., the conversion to mercaptan was significantly lowered. A typical analysis of the product obtained under optimum conditions is shown in Table VI.

B. With a 2.4% phosphotungstic acid on alumina catalyst of this invention under the same conditions of temperature, pressure, and mole ratio of $H_2S$ to butanol, but using a space velocity of 55 (which represents less contact time than a space velocity of 25), butanol was converted to butyl mercaptan in 84% conversion. Table VI lists the conversions of products obtained.

TABLE VI

| | Percent Conversion (Based on Butanol) | |
|---|---|---|
| | A | B |
| Butyl mercaptan | 81 | 84 |
| Percent Secondary butyl mercaptan in mercaptan product | 5 | 2.5 |
| Dibutyl sulfide | 3 | 9 |
| Dibutyl ether | 3 | 0 |
| Unconverted butanol | 6 | 0 |
| Butene-1 | 5 | 7 |

It is evident that the product of B which represents the process of this invention is superior to the prior art process. No alcohol and less secondary mercaptain is present in the process of this invention and this is significant because of the difficulty of removing them from the product. The somewhat greater amounts of sulfide and olefin present in the process of B is not a serious disadvantage because of their ease of removal from the product by distillation.

It is apparent from the above description and examples that the process of this invention represents a significant advance in the art of mercaptan preparation. It will also be apparent by the skilled art-worker that numerous changes may be made from the above description without departing from the invention and accordingly such variations and changes are to be considered within the spirit and scope of the invention.

We claim:

1. A process for the preparation of mercaptans which comprises reacting at a temperature between about 100° and 500° C. an oxygen compound taken from the class of hydroxyl containing compounds and acyclic ethers with hydrogen sulfide in the presence of a catalyst comprising a dehydration catalyst promoted with an activating amount of a compound taken from the class of heteropoly acids, their alkali metal salts and their alkaline earth metal salts.

2. A process for the preparation of mercaptans which comprises reacting hydrogen sulfide and an oxygen compound taken from the class of hydroxyl containing compounds and acyclic ethers at a temperature between about 100° and 500° C. and in the presence of a catalyst comprising a dehydration catalyst promoted with from 0.1% to 10% by weight of the dry catalyst of a compound taken from the class of heteropoly acids containing tungsten as the outer acid forming element, their alkali metal salts and their alkaline earth metal salts.

3. A process for the preparation of mercaptans which comprises reacting hydrogen sulfide with an oxygen compound taken from the class of aliphatic alcohols and ethers which contain up to eighteen carbon atoms, said reaction occurring at a temperature between about 250° and about 400° C. and in the presence of a catalyst comprising alumina promoted with from 0.5% to 5% by weight of the catalyst of a compound taken from the class of heteropoly acids containing tungsten as the outer acid forming element, their alkali metal salts, and their alkaline earth metal salts.

4. A process for the preparation of mercaptans which comprises reacting hydrogen sulfide with a higher aliphatic alcohol containing at least six carbon atoms, said reaction occurring at a temperature between about 250° and about 400° C. and in the presence of a catalyst comprising alumina promoted with from about 0.5% to about 5% by weight of the catalyst of a compound taken from the class of alkali metal and alkaline earth metal salts of a heteropoly acid containing tungsten as the outer acid forming element.

5. A process for the preparation of mercaptains which comprises reacting hydrogen sulfide with a higher aliphatic alcohol containing at least six carbon atoms, said reaction occurring at a temperature between about 250° and about 400° C. and in the presence of a catalyst comprising alumina promoted with from about 0.5% to about 5% by weight of the catalyst of potassium phosphotungstate.

6. The process of claim 5 wherein the alcohol is n-octanol.

7. The process of claim 5 wherein the alcohol is dodecanol.

8. A process for the preparation of mercaptans which comprises reacting hydrogen sulfide with a higher aliphatic alcohol containing at least six carbon atoms, said reaction occurring at a temperature between about 250° and about 400° C. and in the presence of a catalyst comprising alumina promoted with from about 0.5% to about 5% by weight of the catalyst of an alkali metal salt of silicotungstic acid.

9. A process for the preparation of mercaptans which comprises reacting hydrogen sulfide with a lower aliphatic alcohol, said reaction occurring in the vapor phase at a temperature between about 250° and about 400° C., and in the presence of a catalyst comprising alumina promoted with from about 0.5% to about 5% by weight of the catalyst of a compound taken from the class of heteropoly acids containing tungsten as the outer acid forming element, their alkali metal salts, and their alkaline earth metal salts.

10. A process for the preparation of mercaptans which comprises reacting hydrogen sulfide with a lower aliphatic alcohol, said reaction occurring in the vapor phase at a temperature between about 250° C. and about 400° C., and in the presence of a catalyst comprising alumina promoted with from about 0.5% to about 5% by weight of the catalyst of phosphotungstic acid.

11. The process of claim 10 wherein the alcohol is methanol.

12. The process of claim 10 wherein alcohol is ethanol.

13. The process of claim 10 wherein the alcohol is n-butanol.

14. The process of claim 9 wherein the heteropoly acid is silicotungstic acid.

15. A process for the preparation of mercaptans which comprises reacting hydrogen sulfide with an aliphatic ether which contains up to eighteen carbon atoms, said reaction occurring at a temperature between about 250° and about 400° C. and in the presence of a catalyst comprising alumina promoted with from 0.5% to 5% by weight of the catalyst of phosphotungstic acid.

References Cited in the file of this patent

UNITED STATES PATENTS

| | | |
|---|---|---|
| 2,808,441 | Bell | Oct. 1, 1957 |
| 2,816,146 | Doumani | Dec. 10, 1957 |

UNITED STATES PATENT OFFICE
CERTIFICATE OF CORRECTION

Patent No. 3,035,097　　　　　　　　　　　　May 15, 1962

Thomas E. Deger et al.

It is hereby certified that error appears in the above numbered patent requiring correction and that the said Letters Patent should read as corrected below.

Column 1, lines 56 and 57, for "-mercaptain" read -- -mercaptan --; column 2, line 29, for "mercaptains" read -- mercaptans --; column 5, line 7, for "campound" read -- compound --; column 6, line 26, for "of" read -- for --; column 7, line 64, for "presure" read -- pressure --; column 9, line 3, for "mercaptain" read -- mercaptan --; same column, line 31, for "acryclic" read -- acyclic --; column 10, line 1, for "mercaptains" read -- mercaptans --.

Signed and sealed this 11th day of September 1962.

(SEAL)
ttest:

tNEST W. SWIDER
ttesting Officer

DAVID L. LADD
Commissioner of Patents